United States Patent [19]

Pearson

[11] Patent Number: 4,477,720

[45] Date of Patent: Oct. 16, 1984

[54] ADAPTIVE OPTICAL SYSTEM HAVING AUTOMATIC FEEDBACK APERTURE CONTROL

[75] Inventor: James E. Pearson, North Palm Beach, Fla.

[73] Assignee: United Technologies Corporation, Hartford, Conn.

[21] Appl. No.: 333,083

[22] Filed: Dec. 21, 1981

[51] Int. Cl.³ .............................................. G01J 1/20
[52] U.S. Cl. .................................... 250/201; 350/310
[58] Field of Search ............... 350/310; 250/201, 229, 250/230, 205; 372/29, 30, 31, 32, 11, 18, 95

[56] References Cited

U.S. PATENT DOCUMENTS 3,764,937  10/1973  Skolnick et al. ...................... 372/11
4,091,274  5/1978   Angelbeck et al. ................. 350/310
4,249,140  2/1981   Frieberg ................................ 372/95
4,271,355  6/1981   Wisner et al. ...................... 250/201

OTHER PUBLICATIONS

Angelbeck, et al., *Multidither Adaptive Optics System Operation Using a Separate Dither* and corrector mirror, 19-20, Apr. 19-20, 1979, Proceedings of the Society of Photo Optical Instrumentation Engineers.

*Primary Examiner*—David C. Nelms
*Assistant Examiner*—J. Brophy
*Attorney, Agent, or Firm*—Eric W. Petraske

[57] ABSTRACT

An adaptive optical control system employing a multidither servo control of a deformable mirror includes an aperture that adjusts in diameter in response to changes in the output beam.

3 Claims, 3 Drawing Figures

FIG.1
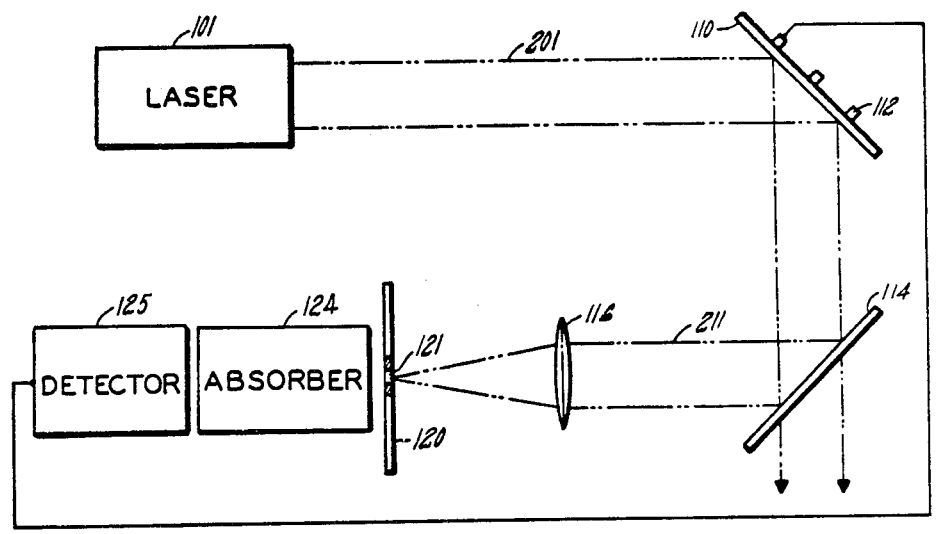
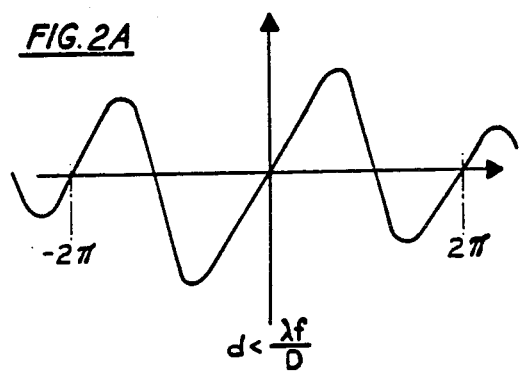
FIG.2A
$d < \frac{\lambda f}{D}$
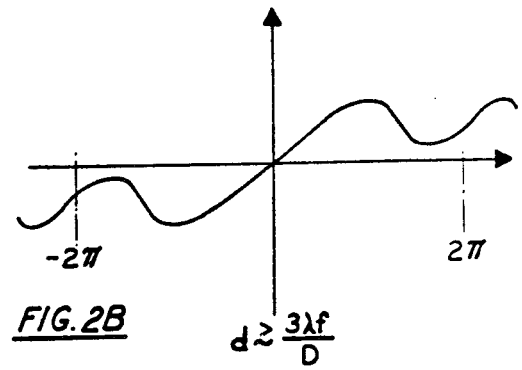
FIG.2B
$d \gtrsim \frac{3\lambda f}{D}$

ADAPTIVE OPTICAL SYSTEM HAVING AUTOMATIC FEEDBACK APERTURE CONTROL

DESCRIPTION

1. Technical Field

The field of the invention is that of an adaptive optical system for controlling an optical beam.

2. Background Art

An article by Elkow and Wisner entitled "Correction of Secondary Intensity Maxima in a Multidither, Hill Climbing, Adaptive Optical System" which appeared in Optics Letters, Vol. 5, No. 9, page 410, discloses an adaptive optical system in which the feedback subsystem includes a variable aperture which is changed from a large opening that has a magnitude sufficient to include more than one diffraction maximum in the output beam intensity distribution to a smaller diameter that is less than the Airy disk of the output beam. Use of the large aperture eliminates the well known 2 $\pi$n problem, in which the system is locked onto a subsidiary maximum in the diffraction intensity distribution. When the deformable mirror which is being controlled by the servo system is adjusted so that the intensity peak on the optical detector is the central diffraction maximum, the aperture is manually reduced in size to a magnitude less than the Airy disk of the beam, so that the beam may be focused for maximum optical quality. This system has the drawback of being nonautomatic and of not being able to respond to changes in the output beam caused by fluctuations in the laser medium or in the atmosphere that have the effect of changing the output beam quality.

DISCLOSURE OF INVENTION

The invention relates to an adaptive optical system of the multidither, hill climbing servo type, in which the problem of controlling the size of the feedback aperture is solved by use of an aperture that automatically responds in diameter to the quality of the output beam.

BRIEF DESCRIPTION OF DRAWING

FIG. 1 illustrates an adaptive optical system constructed according to the invention; and FIGS. 2A and 2B illustrate the improvement in error signal provided by an increased aperture size.

BEST MODE FOR CARRYING OUT THE INVENTION

In FIG. 1, laser 101 generates an output beam 201 which is reflected off deformable mirror 110 which has a number of actuators 112 on the back to provide a desired mirror contour. The beam reflected off the deformable mirror is sampled by beam splitter 114 to produce sampled beam 211 which is focused by lens 116 through aperture 121 in plate 120. The beam then passes through saturable absorber 124, such as SF6, to optical detector 125 which contains a detector element and associated electronics to generate control signals to the actuators 112. The electronics in unit 125 and the actuators in 112 form a conventional multidither, hill climbing servo system, of a type well known to those skilled in the art. Electronics unit 125 controls actuators 112 in order to focus the maximum amount of power through aperture 121. It was disclosed in the Elkow and Wisner paper referred to above, that aperture 121 should be above a certain size when the laser is first turned on in order to perform a rough adjustment of deformable mirror 110 and that aperture 121 should be of a size less than the diameter of the Airy disk of beam 211 in order to provide the optimal focusing. If the aperture has diameter d less than $\lambda f/D$ where d is the servo aperture, $\lambda$ is the wavelength of the radiation in question, f is the focal length of lens 116 and D is the diameter of the output beam, then the error signal produced by electronics unit 125 will be similar to that shown in FIG. 2A in which the signal crosses the zero axis at more than one point. This multiple zero crossing results, as is known in the art, in a possibility that the system will converge at a non-optimal point near one of the subsidiary maxima not at the center. If the aperture is enlarged, however, the secondary maxima are reduced and the secondary zero crossings in the servo error signal disappear, leaving only the desired global optimum servo control point to which the system can converge as illustrated in FIG. 2B. The Wisner and Elkow article disclosed the use of a large aperture initially, reduced to a small aperture over a time long compared to the servo bandwidth. This system has the drawback that it must be controlled manually when the system is first turned on and the further drawback that it is not responsive to changes in the output beam, such as those caused by a fluctuation in laser medium. It may happen, for example, that the system will fluctuate over a time short compared with the servo bandwidth so that the system locks up on a secondary maximum.

The combination of a fixed aperture and a saturable absorber shown in FIG. 1 solves the foregoing problem. The servo error signal for an aperture having a diameter greater than three times the Airy disk is illustrated in FIG. 2B, in which there is only one zero crossing so that the problem of 2 $\pi$n lockup on a secondary maximum is eliminated. When the system is first turned on, the intensity distribution across the surface of the beam is considerably less sharply peaked than it is for an optimally adjusted system so that the absorber sees a relatively uniform intensity distribution and the detector responds to intensity distributed across the aperture surface. As the system adjusts itself to peak the intensity distribution in one central maximum, the saturable absorber passes a greater fraction of incident radiation where the intensity is high than it does where the intensity is low so that the aperture is effectively reduced. The intensity of radiation transmitted near the edge of the beam is not zero, of course, and need not be zero since detector responds primarily to the large amount of radiation traveling in the central maximum. The saturable absorber thus effectively reduces the aperture seen by the detector until the minimum diameter Airy disk aperture is reached.

I claim:

1. An adaptive optical system for controlling an optical beam conprising:
   wavefront adjusting means for controlling the wavefront of said beam;
   a variable aperture having a variable diameter for controlling the diameter of said beam;
   measurement and control means responsive to the optical beam power passing through said variable aperture for controlling said wavefront adjusting means, in which;
   said variable diameter is greater than the diameter of the Airy disk of said optical beam when said beam is initially switched on and said variable diameter is subsequently reduced to a diameter less than said Airy disk diameter, characterized in that:

said variable aperture is formed by a fixed aperture having a diameter greater than said Airy disk, together with a filter medium disposed between said fixed aperture and said measurement means, said filter medium having the property that the transmissivity of said filter medium is a monotonic function of the intensity of optical radiation impinging thereon, whereby the effective diameter of said aperture automatically varies in size as the optical quality of said beam varies.

2. An adaptive optical system according to claim 1, in which said filter medium is a saturable absorber.

3. An adaptive optical system according to claim 2, in which said filter medium is $SF_6$.